July 25, 1967 F. H. DILL, JR., ETAL 3,333,146

OPTO-ELECTRONIC DEVICE

Filed June 29, 1964 4 Sheets-Sheet 1

INVENTORS
FREDERICK H. DILL, JR.
KARL L. KONNERTH, JR.
BY Roy R. Schlemmer, Jr.
ATTORNEY United States Patent Office 3,333,146
Patented July 25, 1967

3,333,146

OPTO-ELECTRONIC DEVICE

Frederick H. Dill, Jr., Putnam Valley, and Karl L. Konnerth, Jr., Yorktown Heights, N.Y., assignors to International Business Machines Corporation, New York, N.Y., a corporation of New York Filed June 29, 1964, Ser. No. 378,596
10 Claims. (Cl. 315—21)

ABSTRACT OF THE DISCLOSURE

The present invention comprises an opto-electronic device capable of converting an amplitude modulated light beam into an electrical signal. According to a first aspect of the invention, the device may be used for analyzing the very fast rise time of a laser beam. In a further aspect of the invention a modified version of the device may be utilized to demodulate or detect a multiplexed signal on a continuous light beam. Generally, the structure includes a cathode ray envelope having a photo-cathode in one end thereof for producing an electron cloud whose density is proportional to the intensity of the amplitude modulated light beam striking same. An electron gun or accelerating assembly is provided for forming the photo-electrons emitted from the photo-cathode into a beam and accelerating same. Deflection plates are provided for suitably deflecting the electron beam to various diodes placed in the face of the tube. These diodes are characterized by the fact that they in effect perform current multiplication of the actual electron current striking same from the electron beam and thus produce a current amplified signal in their output circuits.

The present invention relates to a novel opto-electronic device for converting rapidly changing light signals to observable electrical signals.

More particularly, it relates to systems capable of detecting rapid changes in the amplitude or intensity of an input light signal.

Ever since the development of the first lasers and the subsequent development of various solid state, gas and semiconductor lasers, such as the ruby and gallium arsenide types, there have been many speculations in the scientific community as to the possible utility for such devices. However, in spite of the many predictions of utility, especially in the communications area wherein an extremely high frequency light beam can theoretically be modulated to carry vast quantities of information, such devices and/or systems have not been forthcoming. The problems involved in producing such a communication system reside in a number of areas. First, it will be assumed that operable continuous wave laser devices are available which can produce a satisfactory optical carrier radiation or wave. Once having such a carrier, it is then necessary to first modulate said carrier and then be able to detect same. Once having modulated the carrier, it is then necessary to detect changes in amplitude of the carrier to extract the information therefrom. It is this second general area to which the present invention pertains.

Also, in making modulation studies, it is quite often helpful to be able to study the depth of modulation if possible with a particular carrier which is generally a direct function of the rise time of the carrier generator or transmitter which in such a system would be a laser. It has heretofore been virtually impossible to analyze the rise time of many lasers which are presently being produced since said rise time is extremely short, i.e., in the fractional nanosecond ($10^{-9}$ sec.) range. Similarly, few devices are available which can demodulate or extract information from a laser carrier beam at anything approaching multimegacycle information rates which rates are distinctly possible with light carrier frequencies. Such devices as are available either have a very narrow operating bandwidth or have quite low sensitivity.

What has now been found is that by utilizing a fast photocathode material within a cathode ray tube and utilizing a plurality of relatively slow high current gain diodes in the face thereof, said diodes being rendered conductive by the impingement of an electron beam thereon that a very effective detector for changes in intensity of a light or laser beam is obtainable. This device or various modifications of same may be utilized in a relatively simple system for analyzing the rise time of a laser and in another form may be utilized to demodulate or convert from a serial to parallel representation the information upon a modulated light beam. This latter operation is obtainable at extremely rapid repetition rates.

It is accordingly a primary object of the present invention to provide an opto-electronic device which is responsive to changes of intensity of a light beam in the fractional nanosecond range.

It is a further object to provide a system for analyzing the rise times and wave shapes of a laser or similar radiation beam.

It is yet another object of the invention to provide a system for demodulating high frequency modulation on a light beam.

Yet another object of this invention is to provide a system for the serial to parallel conversion and demodulation of a high frequency serially modulated light beam.

The foregoing and other objects, features and advantages of the invention will be apparent from the following more particular description of preferred embodiments of the invention, as illustrated in the accompanying drawings.

Figure 3A:
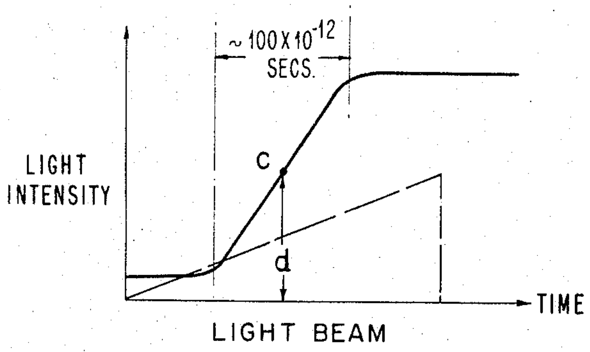

FIGURE 3*a* is a graph illustrating the leading edge of a laser pulse.

Figure 1:
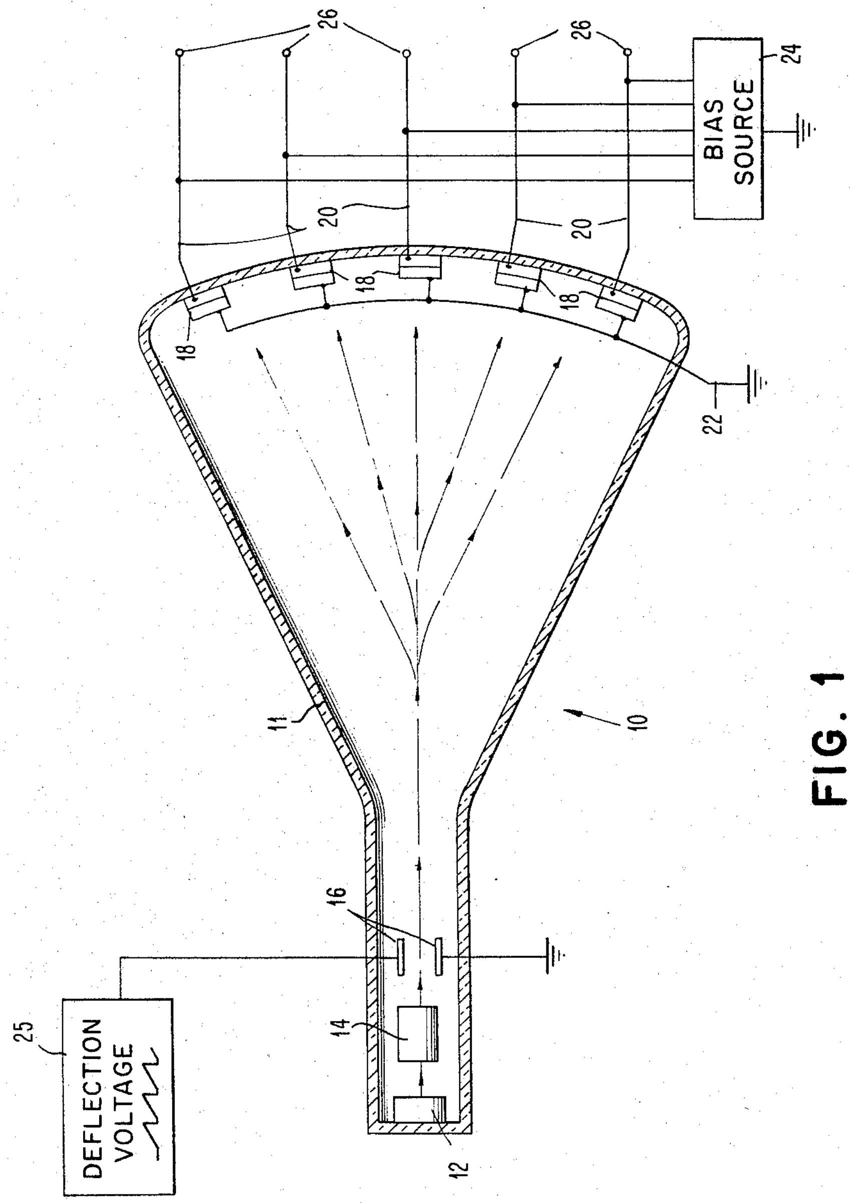
FIGURE 1 is a cross-sectional view of a typical opto-electronic device constructed in accordance with the teachings of the present invention.
Figure 3B:
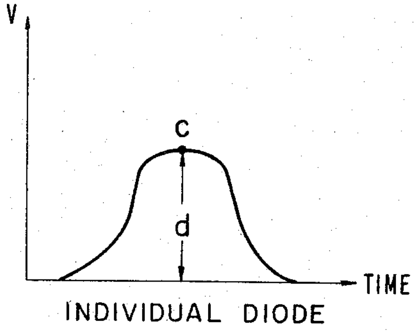

FIGURE 3*b* is a graph illustrating the voltage vs. time plot for a diode located in the face of the device of FIGURE 1.

Figure 2:
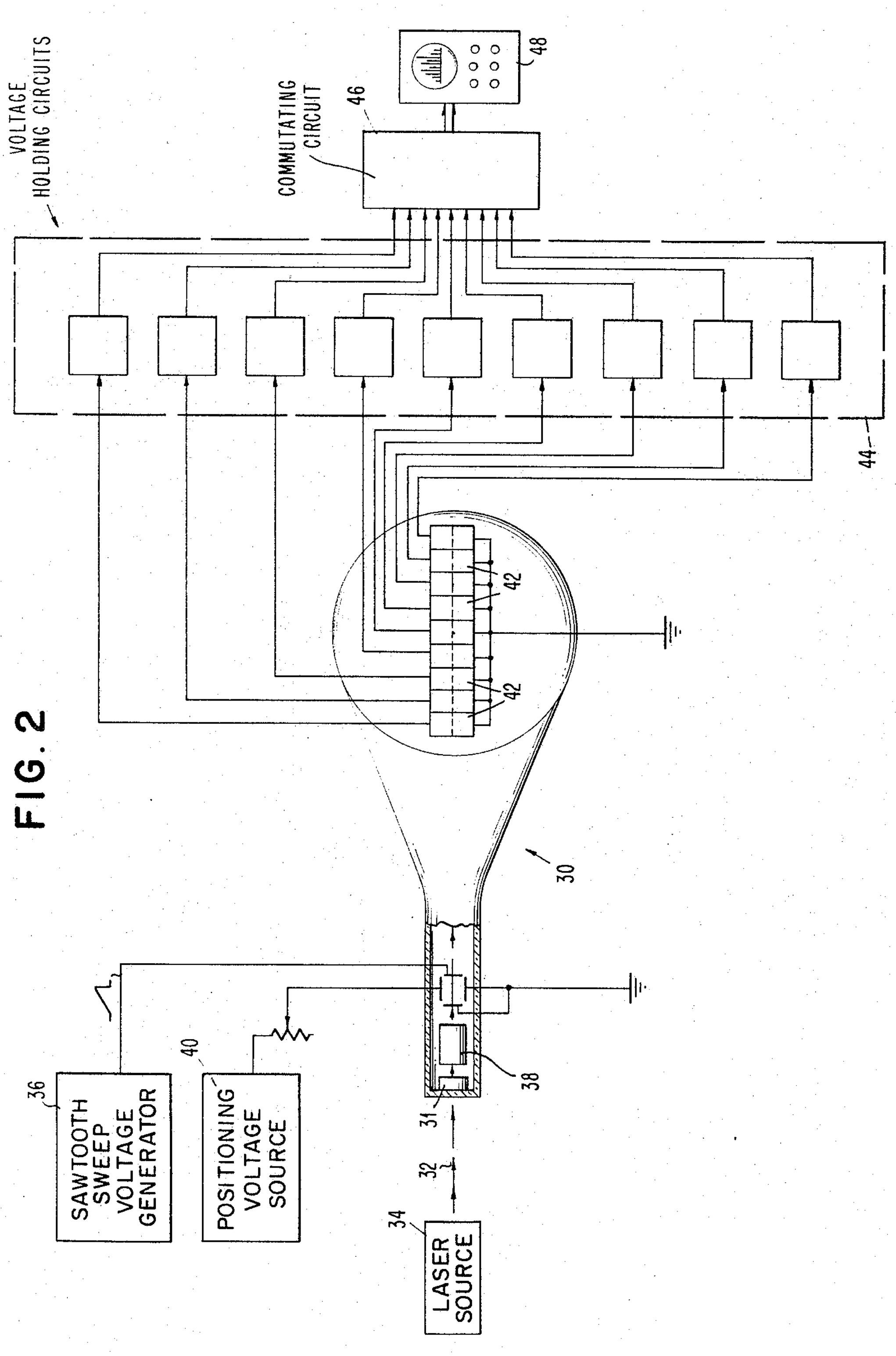
FIGURE 2 is a functional block diagram of a system for analyzing the rise time of a high intensity light beam.
Figure 3C:
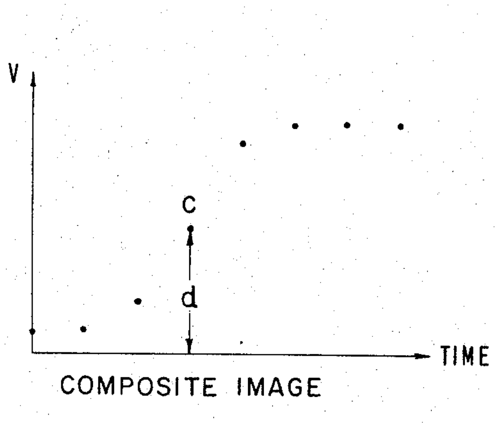

FIGURE 3*c* is a curve illustrating the composite waveform on the oscilloscope of FIGURE 2.

Figure 4:
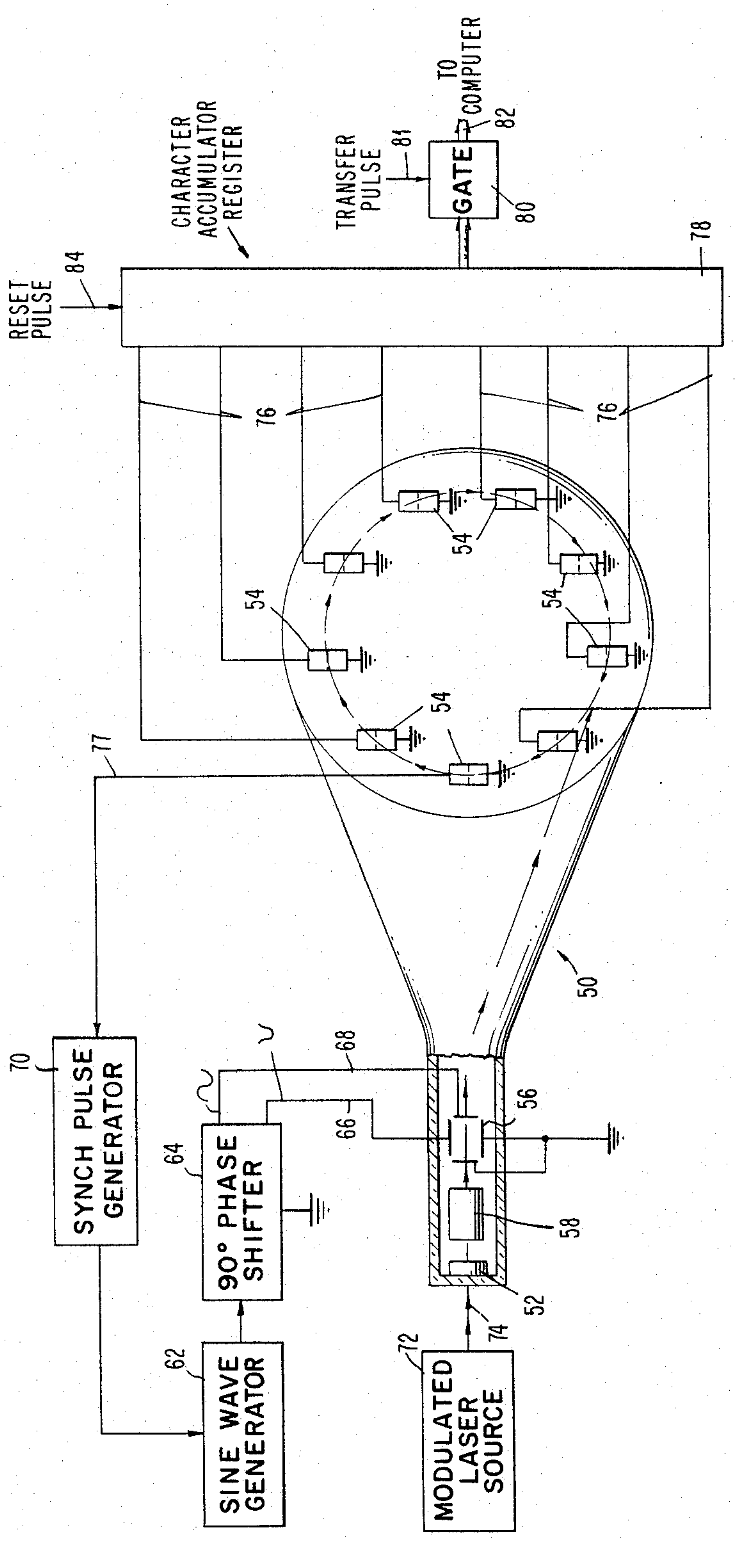

FIGURE 4 is a functional block diagram of a system constructed in accordance with the present invention for converting and demodulating a high frequency modulated light beam into a parallel output signal system.

Figure 5A:
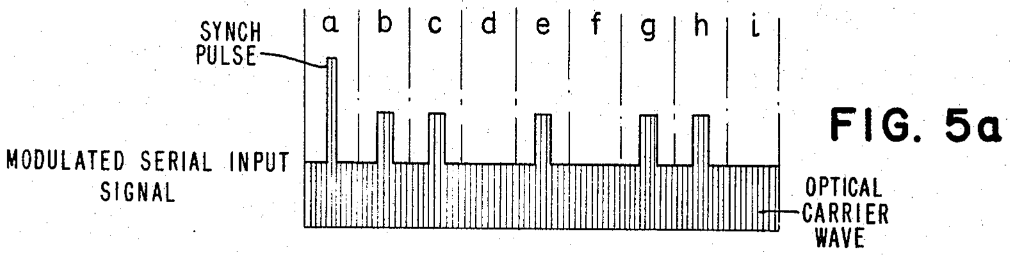
Figure 5B:
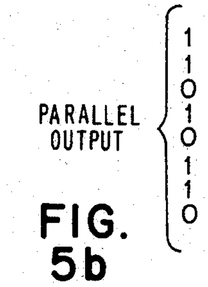

FIGURES 5*a* and 5*b* illustrate the waveform of a serial input signal and a binary representation of a parallel output signal respectively obtainable by the system of FIGURE 4.

Figure 6:
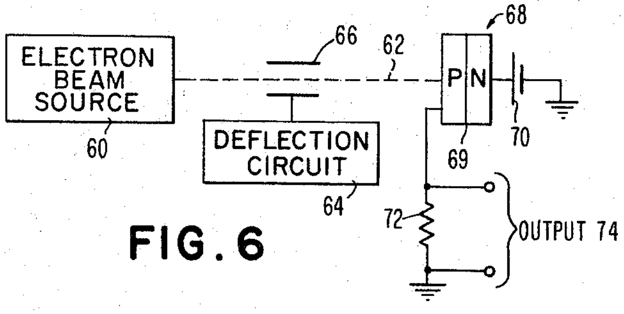

FIGURE 6 is a combination block and schematic diagram illustrating an exemplary diode biasing and output circuit configuration.

The objects of the present invention are accomplished in general by an opto-electronic device for converting a high energy light beam into an electrical signal which comprises a cathode ray tube structure having a photo-cathode whose active surface is sensitive to the wavelength of an impinging light beam, an electron gun structure for forming the photo-electrons into a beam, deflection means for deflecting the electron beam generated by said photo-cathode in a desired sweep pattern, and a plurality of semiconductor current generating means located in the front face of said cathode ray tube, said generating means being of a type which produces current flow proportional to the intensity of an impinging electron beam, means for controlling the sweep of said cathode ray beam across said current generating means in a desired time sequence, such that said current generating means provide a sampling of said electron beam during the traversal of said sweep.

By using suitable current gain diodes in the face of said cathode ray tube, it is possible to get a large amplification factor relative to the intensity of the light signal impinging upon the photocathode and thus the intensity of the electro beam impinging on said diodes. It is further possible to use a photocathode material which is sufficiently responsive to follow the fractional nanosecond rise time of, for example, a laser pulse, and although the sensitivity of such photocathode materials is too weak when used alone, the combination with the current generating means or diodes in the face of the tube provides more than satisfactory amplification, thus allowing close examination of such rise times.

The specific system for accomplishing this result will be described later with respect to the system of FIGURE 2. It should be noted that conventional photomultiplier tubes are unable to follow the very fast rise time of a laser due primarily to the structure of the electrodes or dynodes within the tube and the resultant interaction between same. Also, conventional photocells having sufficient response times to follow such a rise provide an extremely weak signal which is very difficult to amplify because of the wide bandwidth requirements. By means of the present invention, the inadequacies of the various prior art devices are avoided. The specific device illustrated in FIGURE 1 may be utilized to analyze the leading edge or rise portion of a laser beam as previously explained or may conversely be used to directly commutate or sample a very high frequency, serial, amplitude modulated series of pulses on an incoming high intensity light beam which system is illustrated in FIGURE 4. The basic principles of operation of the actual sampling tube or opto-electronic device are the same insofar as they both require a small area photocathode for receiving the amplitude modulated light beam, a beam forming electron gun including accelerating and focusing means, suitable deflecting means and a plurality of current generating semiconductor diodes in the face of said tube connected to suitable biasing and subsequent utilization circuitry. The pattern or arrangement of the current generating means in the face of the tube may vary somewhat depending upon the particular use to which it is desired to put the devicce as is apparent in the different embodiments of FIGURES 2 and 4.

Having generally described the invention, the various features and embodiments thereof will now be set forth with reference to the drawings, in which FIGURE 1 is a cross-sectional view taken through a typical opto-electronic device constructed in accordance with the teachings of the present invention. Referring now to the figure, it will be seen that the device 10 includes a relatively conventional cathode ray tube envelope 11. Located within this tube are the photocathode 12 and electron gun means 14 widely used in the art for accelerating the photo-electrons and focusing or confining same into an electron beam of defined cross-sectional area. Deflection plates 16 are utilized as it is well known to traverse the sweep in a given plane across the face of the tube 10. Only two such plates are shown but obviously two additional plates in quadrature to the plates 16 may be employed to obtain deflection of the beam in the 90° direction. The semiconductor diodes indicated by reference numerals 18 may be chosen from a great many available diodes such as a conventional silicon diode as will be described subsequently with reference to FIGURE 6. The essential characteristic of the diode is that when it is struck by an electron beam, the diode which is normally reverse biased will conduct current quite heavily due to electron bombardment because of the generation of electron-hole pairs by the electron beam. The magnitude of the current conduction of said diodes is substantially proportional to the intensity of the electron beam striking same. These diodes may be affixed within the face of the cathode ray tube in any number of suitable ways. The manner in which the diodes 18 are applied in FIGURE 1 consists of fastening same upon the face of said tube as by cementing and bringing individual leads out of the face of the tube which leads are connected to a desired region of each of said diodes. The other region or n region in the present embodiment is indicated schematically as being connected to a common wire brought out to a common ground source. The output leads 20 may be brought out through the face of the tube in any conventional manner of making such wire to glass seals. The common or ground lead 22 is brought out of the envelope at a single point where it can conveniently be grounded. A bias source 24 provides bias for each of the individual diodes. This bias voltage is adjusted so that the diodes do not conduct significantly until an electron beam strikes the junction thereof. When this happens, a current will be generated in the diode and a voltage will appear at the output terminals 26. These terminals can, of course, be sampled in any conventional manner.

One example of the many types of diodes that could be employed with the opto-electronic device of FIGURE 1 and suitable biasing and sensing circuitry therefor is shown in FIGURE 6. The gun 60 would have its beam 62 deflected by the deflection circuit 64 and plates 66. The screen of the tube would consist of an array of p-n diodes such as 68 in FIGURE 6. A silicon diode is one example of the many types of semiconductor diodes that could be employed. A suitable structure would be a shallow diffused planar silicon junction diode containing gallium as the p conductivity type determining impurity and phosphorus as the n conductivity type determining impurity in concentrations of $1\times10^{16}$ and $5\times10^{17}$ atoms/cm.$^3$, respectively. Each p-n junction diode 68 is reversed biased by battery 70. A resistor 72 is in series with the p layer of the diode and forms part of the output circuit of said diode 68.

In operation, when the deflected beam 62 rests in its selected position and strikes one of the p-n junctions 69 in the array represented by diode 68, it creates several thousand hole-electron pairs per incident photo-electron. The junction 69 of diode 68 separates the charge, the latter appearing as a current through resistor 72, and the voltage drop across the latter appears as a signal on output terminals 74. The diode sensing mechanism is particularly advantageous for sensing the very rapidly deflected beam 62 because the beam of photo-electrons can be swept across the diode rapidly so that the diode is struck only by a small "time sample" of the beam. This time sample can be very short compared to the rise time of the pulse produced in the output circuit. It will be apparent that various types of diodes may be chosen for a particular application such as where more current amplification is desired with some sacrifice in response or diode rise time.

A deflection voltage source 25 is provided to sweep the electron beam across the face of the tube and across the devices 18. Depending upon the particular array of device 18 on the face of the tube, any one of a number of deflection voltages or voltage waveforms may be employed. For the simple linear sweep which is desired in the configuration of FIGURE 1, a simple ramp or saw-tooth voltage is provided as indicated in the figure. This voltage performs the function of sweeping the electron beam across the tube in a desired increment of time and retracing said sweep virtually instantaneously before initiating a subsequent sweep. It will be apparent that a number of different deflection voltage waveforms may be used depending on the pattern and time rate of change of the sweep that is desired for a particular application. For example, in the embodiment disclosed in FIGURE 4 two time varying deflection voltages are required to obtain the circular sweep pattern as will be more specifically described with respect to this figure subsequently.

The photocathode 12 is a small area device in that it is only necessary to receive, in essence, a point source of the incoming light beam. In the case of a laser, the whole beam is sufficiently small that no masks or other limiting devices are necessary to restrict the area of the photocathode exposed to said beam. The material on this photocathode is a typical photo-emissive layer which, when struck with a light beam, emits electrons which in the present structure are formed into an electron beam and accelerated through appropriate accelerating and focusing plates and passed on through the deflection plates. The actual material of the photocathode surface may be chosen from a rather wide variety of available photoemissive compounds. The important fact to consider in choosing a material is that certain compounds are especially tailored for specific wavelengths of impinging light. For example, for a wavelength or impinging radiation of 8400 angstroms, a material such as S–1 would be used. This designation is very common in the art and basically includes silver (Ag) oxygen (O) and cesium (Cs). From a detailed description of a process for making such a compound, reference is made to the text "Infrared Technology," John Wiley and Sons, 1962, New York. In addition to being activated by light of a particular wavelength, the photo-emissive material on the photocathode must also be capable of responding rapidly to changes in impinging energy, i.e., there must be no inertia or time delay in responding. As stated above, the materials commonly employed as photocathodes such as the S–1 compound mentioned above have been found suitable to closely follow changes in intensity down to the fractional nanosecond ($10^{-9}$) range. As illustrated somewhat schematically in the drawing of FIGURE 1, the photocathode would be mounted within the main body of the cathode ray tube, but would be viewable through the end thereof through a suitable window which would preferably be constructed of the same glass as the tube envelope itself. The controlling factor to be considered here is that the material of the window must not distort or absorb substantial quantities of the input radiation.

As stated previously, the semiconductor diodes 18 located in the face of the tube may be mounted adjacent said face in a number of different fashions. In addition to the actual affixing or cementing of the diode directly to the face of the tube screen, said diodes could be mounted on a suitable support within the tube spaced a short distance from said screen wherein they might all have a common portion of a first conductivity type material and a plurality of p regions of opposite conductivity type material. The important consideration for the ultimate structure is that the actual junction of each device be bombardable by the electron beam from the photocathode. Additionally, it is possible to employ masks in front of the individual junctions in order to obtain an improved or sharper time definition from the individual diodes. Other mounting methods for such diodes and fabrication of the face plate of the device would, of course, be apparent to one skilled in the art.

While the drawings have shown the tube envelope 11 (FIGURE 1) as being the shape of a conventional cathode ray tube, it is to be understood that the envelope may take any convenient shape such as a cylinder. Further, the material forming said envelope would not necessarily have to be glass, as metal or some other material would be equally satisfactory.

As stated previously, various semiconductor diodes may be used as the current amplifying diodes 42. It is not possible to specify particular commercially available structures since such diodes are conventionally encapsulated. However, minus the encapsulation, most such diodes could be used. It will be noted that while the above diodes may not be particularly fast, inasmuch as they would be incapable of following the changes in amplitude of the electron beam striking same, they do have an extremely high current gain relative to the energy of the electron beam striking same.

Thus, the opto-electronic device illustrated in FIGURE 1 utilizes two basic components, i.e., the photocathode and the current generating diodes which taken alone are completely unsuitable for the purpose of analyzing a laser beam but which when utilized in the combination taught by the present invention provide a unique device which is sufficiently sensitive and responsive to enable the monitoring of even the rise time of a laser and which at the same time provides sufficient output current that very little amplification is required prior to the utilization of the output signal as will be described with respect to FIGURES 2 and 4.

Referring now to FIGURE 2, there is shown a block diagram of a specific embodiment of the present invention utilized to analyze a portion of a laser beam such as the rise time. This system comprises a cathode ray opto-electronic device 30 of the type described in FIGURE 1 above. Feeding into the photocathode 31 of the device 30 is a laser beam 32 from a suitable laser source 34. A saw-tooth sweep voltage generator 36 is provided to give a linear sweep in the horizontal direction across the face of the device 30. The electron gun means 38 and voltage source 40 are provided for the purpose of forming a sharp electron beam and positioning same vertically with respect to the current generating diodes 42 located in the face of said tube.

The output of each of the current generating diodes 42 is connected to a respective holding circuit 44 which is a conventional circuit known in the art which, in essence, stores for a short period of time the maximum voltage appearing across its input terminals. A suitable sampling or commutating device 46 is provided having as many inputs as there are voltage generating diodes 42 and having a single output which is applied to the vertical deflection circuit of the oscilloscope 48. Thus, as the electron beam generated by the impinging laser light beam sweeps across the diodes 42 each one will develop a voltage or current output signal indicative of and proportional to the intensity of the electron beam at the time said beam strikes the junction of that particular device. The voltage produced by each of these diodes is held for a short period of time in the holding circuits 44, thus allowing the commutating device to sample said stored voltages as many times as necessary to provide a satisfactory display and the oscilloscope is able to provide either a bar or dot graph on the face of the oscilloscope which accurately represents the envelope of the rise time of the laser beam 32 which was shone on the photocathode 31. In actual practice it may be found that a holding circuit is not necessary since the diodes 42 will hold a maximum voltage generated for a finite time to allow commutation and display thereof. Also, in place of the single oscilloscope and commutating circuit it may be desirable to use a separate oscilloscope for each diode. In any event, such modifications would be clearly within the knowledge of a person skilled in the art.

The use of the present device allows a much slower commutating and presentation scan than would be possible if a single photocell and oscilloscope were to be used to try to examine said rise time. As stated previously, such a photocell or photomultiplier tube does not exist since devices capable of responding to changes of the impinging radiation have insufficient output voltage to drive an oscilloscope or else are not capable of following very rapid changes in radiation levels.

The present system provides a means for accurately sampling and storing for subsequent observation and analysis an accurate record of the rise time of a laser. If this turn on or rise is essentially a single shot phenomenon or occurrence, it is not possible to turn the laser on repetitively and observe a singly sampled output thereof in synchronism with the sweep of a conventional oscilloscope as is the case with most oscilloscope viewable occurrences. Further, it would not be possible to sweep an oscilloscope fast enough to expand the rise time portion to any usable degree.

Referring to FIGURES 3*a*–3*c*, there are shown curves illustrative of the principles involved in the system of FIGURE 2.

FIGURE 3*a* is an intensity vs. time plot for the input laser beam 32. This curve is essentially a time-intensity profile and illustrates a typical rise time for a laser. The duration of the rise time and thus the sloped portion of this curve, in certain instances, can be on the order of 100 micromicroseconds ($10^{-12}$ seconds) or less.

FIGURE 3*b* illustrates the voltage output appearing across the output terminal of one of the individual diodes 42 of opto-electronic device 30.

FIGURE 3*c* is a voltage vs. time plot wherein each dot represents the maximum voltage detected by a different one of the current generating diodes 42 wherein such voltages are displayed on the face of the oscilloscope 48. It will be noted that in all of these figures, a distance *d* approximately midway up the slope of the curve illustrates the interaction of the various devices of the system. As will be seen in FIGURE 3*b*, this distance *d* represents the maximum voltage developed across a diode which is rendered conductive at the time the light beam and thus the electron beam within the tube 30 is at intensity point *c* on the curve of FIGURE 3*a*. Referring again to FIGURE 3*c*, the distance *d* is proportional to the maximum voltage appearing across the diode 42 whose generated voltage is represented in FIGURE 3*b* and is thus proportional to the intensity of the laser beam at point *c* on the curve of FIGURE 3*a*. The dashed saw-tooth waveform in FIGURE 3*a* illustrates the relationship between a typical sweep signal voltage such as would be applied to the deflection plates by source 36 and a typical light pusle rise time such as that illustrated in FIGURE 3*a*. It will be noted that the sweep would normally be chosen to substantially overlap both ends of the sloped portion of the curve representing the rise time so that a complete plot of same may be obtained. The particular length of this sweep is not overly critical. In any event, choosing a proper sweep time would be within the purview of one skilled in the art.

Referring now to FIGURE 4, there is illustrated an embodiment of the present invention which would be suitable for converting from a serial information input signal modulated on a high intensity light beam to a parallel output electrical signal for use by, for example, a computer system. A typical example of where such a system would be useful would be where binary characters are placed in serial fashion on a laser beam for transmission and it is desired to operate on the information within the receiving set, i.e., a computer, character by character, wherein a plurality of such binary signals representing a character would of necessity be transferred in parallel fashion from point to point. FIGURES 5*a* and 5*b* illustrate this feature of such a system. In FIGURE 5*a* there is illustrated a typical 8 bit binary character in positions *b* through *i* with a synchronizing (synch) pulse at position *a* which will operate in a manner to be described subsequently. The binary information illustrated in waveform 5*a* would typically be placed on the carrier serial fashion, i.e., bit by bit wherein nine bit positions (including the synch pulse) following sequentially in time of occurrence. It is common within a computer to utilize such characters in parallel and transfer same over suitable transmission lines. Thus, the signal in binary form may be as represented as in FIGURE 5*b* where a "1" is represented as a positive signal and a "0" represented as no signal. These pulses would go out on a suitable cable in parallel from one register to another in the computer. Thus, in a single unit of time it can accomplish the transferring of a complete character rather than requiring eight time units to transfer the character to the various registers bit by bit. It may thus be seen that a system for converting from a serial to a parallel transmission form has considerable utility in the area of computer technology. This fact is more especially true when it is considered that it is the common practice to modulate any electromagnetic carrier wave in serial fashion.

The block diagram of FIGURE 4 illustrates a basic system capable of converting a serial input signal into a parallel output form such as illustrated in FIGURES 5*a* and 5*b* just described. In the system illustrated in FIGURE 4, the opto-electronic device 50 operates in substantially the same manner as illustrated with reference to FIGURES 1 and 2. The device includes photocathode 52, current generating diodes 54, a set of deflection plates 56 and electron gun means 58 all of which operate in substantially the same manner as set forth in the previous figures. A slight modification is the arrangement of the diodes 54 in the face of the device 50. It will be noted that these diodes are arranged in a circle. This arrangement is used due to the cyclic nature of the sweep necessary for this system. The circular sweep is obtained in a well known manner and includes the sine wave generator 62 and the 90° phase shifter 64 which provide on lines 66 and 68 two sine waves which are 90° out of phase and which will, as is well known, produce a circular sweep on the face of a cathode ray tube when applied to the pair of deflection plates 56. The synch circuit 70 detects the synch pulse which accompanies each 8 bit charater set and amplifies this pulse and supplies it to the sine wave generator so that the circular sweep may be synchronized with the repetition rate of the character sets in the serially modulated information input signal on the laser beam. The laser beam itself emanates from a modulated laser source 72 which provides output beam 74 modulated as indicated in the waveform of FIGURE 5*a*.

Lines 76 are brought out from the 8 character bit diode 54 to the block labeled Character Accumulator Register 78. It will be noted that the single line 77 going to the synch circuit 70 is connected to the specific diode utilized to detect said synch pulse. The character accumulator register may be chosen from any number of well known registers. For example, the register may comprise a series of bistable flip-flops, resettable to "0" at the end of each character cycle and settable to "1" by an output on a respective one of the lines 76. Gate 80 is supplied with an actuating or transfer pulse on line 81 to transfer information an 8 bit character at a time out of the Character Accumulator Register 78 to subsequent portions of the computer circuitry whether this be input to a central computer system or some storage device. The characters go out through cable 82 which may be either an 8 or 16 wire cable depending on the particular system utilized for setting the subsequent registers. As stated previously, the Character Accumulator Register 78 is reset by a reset pulse appearing on line 84 at the end of each character input cycle.

The system disclosed in FIGURE 4 is thus capable of demodulating an amplitude modulated high intensity light beam such as a laser beam and is further capable of converting a serially modulated input signal on this beam to a group of parallel output signals. While the system is specifically illustrated and set up for the purpose of converting from a serial bit by bit transmission to a parallel character by character output, it is to be understood that this sort of general arrangement could be utilized as a demultiplexer or detector for any time-displaced multiplex signal arrangement wherein a plurality of input channels share a single carrier in a prescribed sequential fashion.

It is important to note that the system of FIGURE 4 allows circuitry which is capable of easily handling data at the character (parallel) rate rather than at the bit (series) rate. In other words, it allows, in the present example, a frequency handling capability one-eighth of that which would be required if the data were handled in the original serial order.

The opto-electronic device and systems disclosed by the present invention afford a means for directly detecting and utilizing light signal information transmission hitherto unavailable in the art. One embodiment of the invention, i.e., FIGURE 2, allows detailed studies of the rise time of various lasers and thus is a valuable aid in examining the performance of such lasers. The invention thus allows studies of pulse performance and modulation for various light sources in addition to lasers. It has obvious utility for both study purposes and for use in actual communications systems. The significant contribution to the art is that it operates in speed and sensitivity ranges heretofore unattainable in previous devices.

The system illustrated in FIGURE 4 may be utilized either as a serial to parallel code converter or with some modification, as a demultiplexing detector. It being understood that such modifications would be within the purview of one skilled in the art, and would not require a significant departure from the spirit and scope of the present invention.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for analyzing a variable amplitude light beam including:
a light source;
an opto-electronic device comprising:
an evacuated tube closure having a photocathode at one end thereof;
electron gun means for forming photoelectrons emitted from said photocathode in an electron beam;
deflection means for said beam;
a plurality of semiconductor diodes located at the opposite end of said tube enclosure from said photocathode;
each said diode having a separate output terminal;
means for deflecting said electron beam in a predetermined pattern with respect to said diodes to sweep said electron beam across said diodes as light is being received at said photocathode from said light source; and
means for detecting the current generated in said diodes as a result of the electron beam striking same.

2. A system as set forth in claim 1 wherein said photocathode is made of a material particularly sensitive to the wavelength of the impinging radiation from said light source and which is capable of effecting changes of photoemission as rapidly as the rate of change of the intensity of said radiation from said light source.

3. A device as set forth in claim 1 wherein:
each of said output terminals is connected to a voltage holding circuit;
each voltage holding circuit is connected to commutating circuit means; and
the output of said commutating circuit means being connected to viewing means.

4. A system as set forth in claim 1 wherein each output terminal is selectively connectable to an oscilloscope.

5. A system as set forth in claim 2 wherein:
the light source comprises a laser;
the diodes are arranged in a linear pattern across the face of said opto-electronic device; and
means for applying a saw-tooth sweep voltage to one set of the deflection means for achieving a linear sweep of the electron beam across said diodes whereby the output of said diodes in any one sweep of said electron beam represents a time sampling of the intensity of the laser beam striking said photocathode during a period of time equal to the sweep of said electron beam.

6. An optical demodulating system for converting serially modulated information on an optical carrier wave into a parallel output signal which comprises:
means for transmitting said modulated light beam;
an opto-electronic device comprising:
an elongated tube envelope having in one end thereof;
a photocathode adapted to receive said modulated optical carrier wave and produce a number of photo-electrons proportional to the intensity of the carrier wave striking same;
electron gun means for accelerating and focusing said photo-electrons into an electron beam;
deflection means for deflecting said electron beam; and
a plurality of diodes located in the opposite end of said tube envelope from said photocathode and adapted to be scanned by said electron beam;
means for synchronizing the scan of said electron beam with the serial modulation cycle of said light beam so that as said beam sweeps each of said diodes, said diode receives a signal characteristic of a particular time displacement from the zero position of said cycle;
accumulating means for detecting and storing the signal generated in each diode during one cycle of said sweep; and
means for gating the information out of said accumulating means at the end of a sweep cycle.

7. A demodulating system as set forth in claim 6 wherein:
said diodes are arranged in a circular pattern at one end of said tube enclosure and the electron beam is swept in a circular sweep pattern across said diodes; and
means including a synch pulse source actuable by a transmitted information pulse modulated on said optical carrier wave for maintaining synchronism between the sweep of said electron beam and the cyclic modulation rate of said impinging modulated carrier wave.

8. A system as set forth in claim 7 wherein said light source comprises a high intensity laser.

9. A system as set forth in claim 7 wherein:
the photocathode material is particularly sensitive to the wavelength of said optical carrier wave; and
wherein the photo-emission thereof is capable of reflecting the changes of intensity of said optical carrier wave due to the modulation thereof.

10. An opto-electronic device for converting a light beam into an electric signal, said device comprising:
an evacuated tube enclosure having a photocathode at one end thereof;
electron gun means for forming photoelectrons emitted from said photocathode into an electron beam;
deflection means for said beam;
a plurality of semiconductor diodes located at the opposite end of said tube enclosure from said photocathode;
each said diode having at least one separate output terminal;
said deflection means including means for deflecting said electron beam in a predetermined pattern with respect to said diodes to sweep said electron beam across said diodes as light is being received at said photocathode; and
means cooperative with said enclosure for transmitting light onto the surface of said photocathode from an external light source.

(References on following page)

References Cited

UNITED STATES PATENTS

| | | | |
|---|---|---|---|
| 2,365,006 | 12/1944 | Ricketts | 313—65 X |
| 2,886,739 | 5/1959 | Matthews | 315—12 |

OTHER REFERENCES

"Photographic Studies of Mode and Polarization Phenomena in Rudy Lasers," C. M. Stickley, D. W. Lipke, and T. J. Healey, Journal of The SMPTE, vol. 72, No. 7, July 1963, p. 534.

"Electron Microscope," C. Schuler, IBM Technical Disclosure, vol. 6, No. 10, March 1964, p. 110.

JOHN W. CALDWELL, *Acting Primary Examiner.*

DAVID G. REDINBAUGH, *Examiner.*

T. A. GALLAGHER, R. K. ECKERT, Jr.,
*Assistant Examiners.*